Patented Apr. 4, 1939

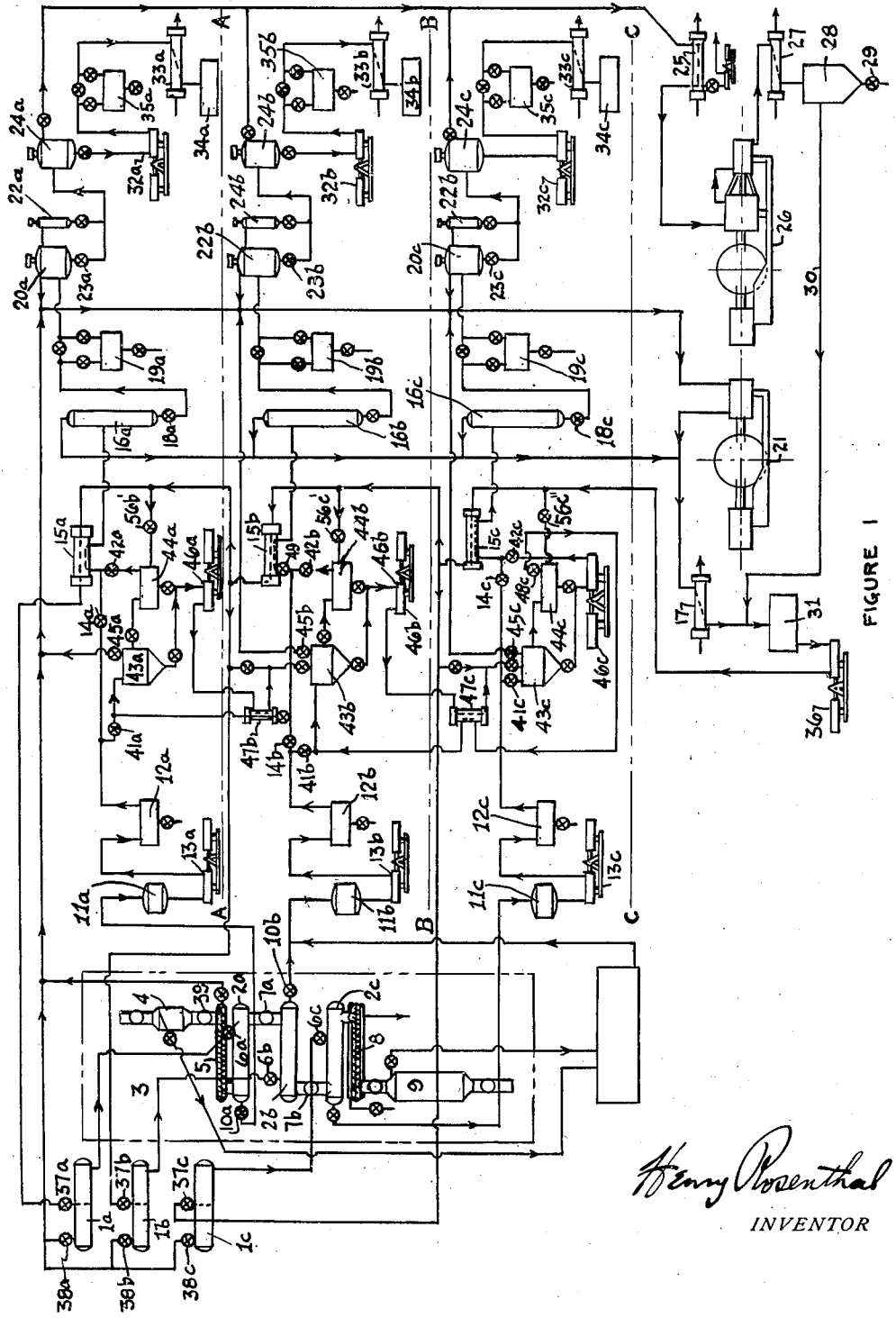

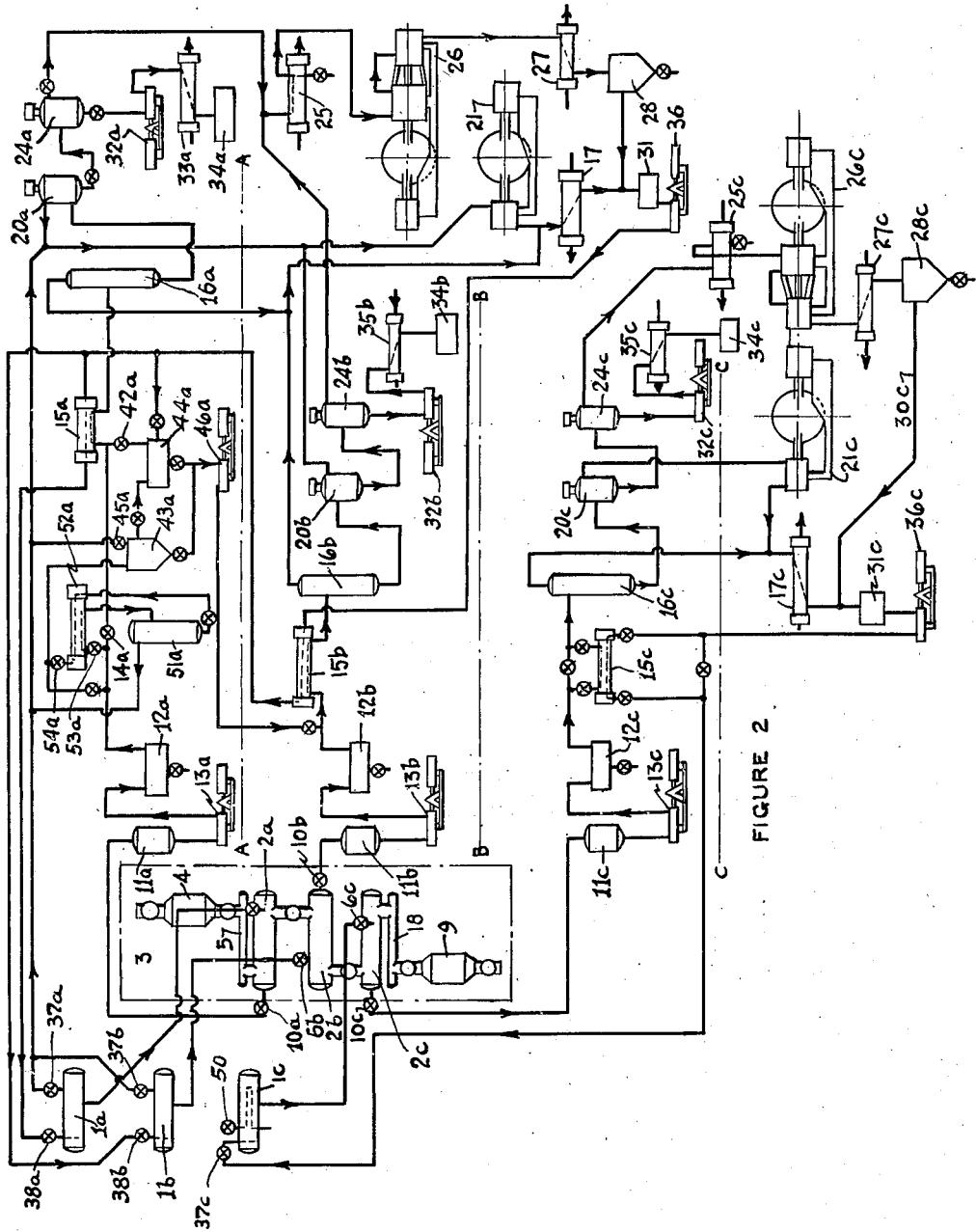

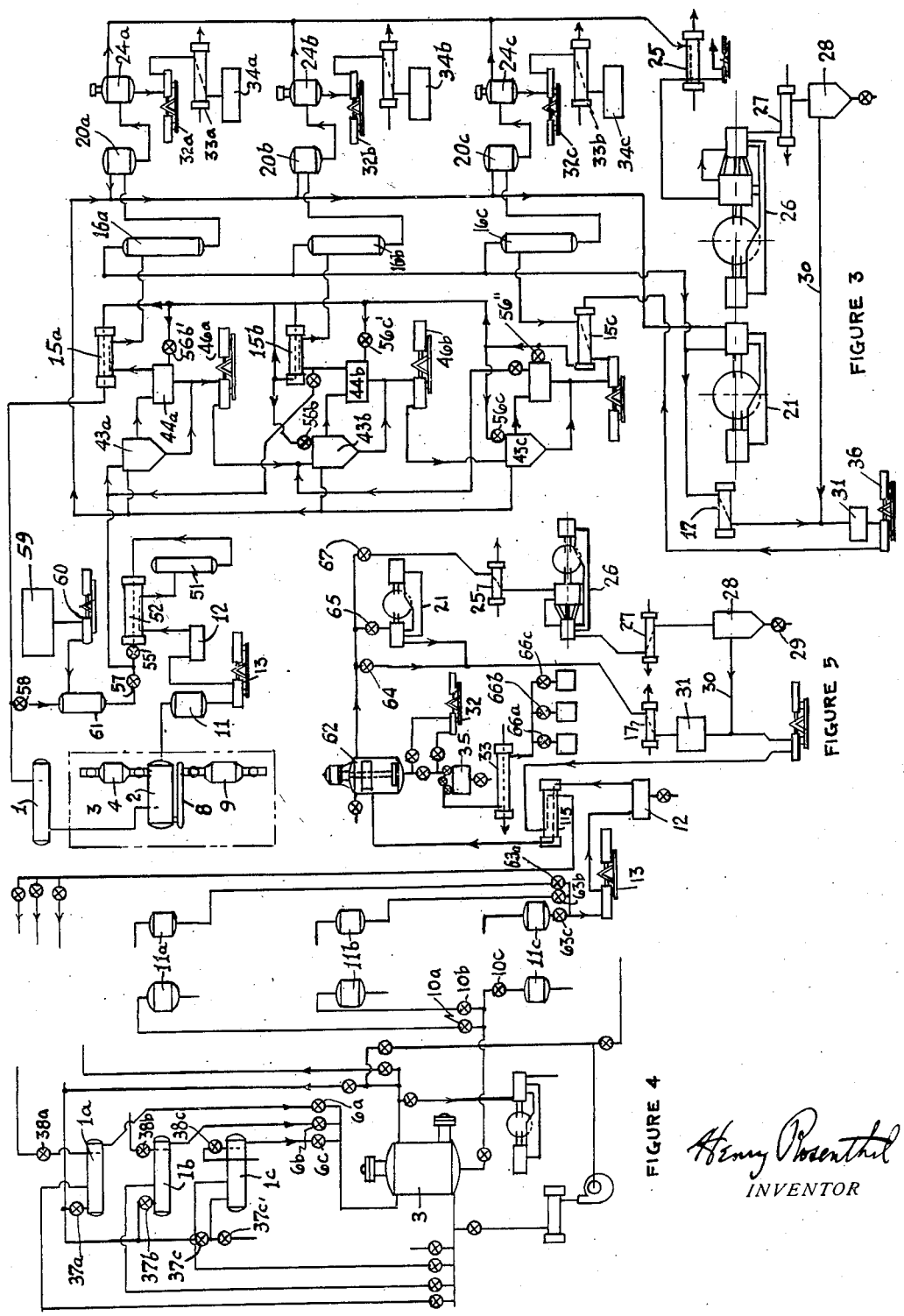

2,152,666

UNITED STATES PATENT OFFICE 2,152,666

SEPARATION OF OILS

Henry Rosenthal, New York, N. Y.

Application August 4, 1934, Serial No. 738,401

19 Claims. (Cl. 87—6)

My invention relates to novel apparatus for and methods of separation of oil into components of different solidification or freezing points. It is particularly related to the extraction of fat or oil by bringing the products from which the fats and oils are to be extracted into contact with low boiling hydrocarbons under pressure as a solvent, utilizing these hydrocarbons as media for effecting the separation by controlling the temperatures at which the operations are conducted.

I prefer that the principal separation be secured by controlling the temperatures at which the extraction is conducted, but equivalent results may be obtained by proper temperature control for manipulation of the solution after it leaves the extractor but while appreciable quantities of solvent remain therein.

Thus, I am able to obtain a plurality of oils having different properties from each other either from a single raw material by obtaining directly separate solutions containing different oils or by obtaining a single solution of a mixture of these oils and removing from the solution various oily fractions, or I can obtain a partial separation, during the extraction process, and obtain a more complete separation after the solution has been withdrawn from contact with the material being extracted.

Substantially, all organic oils are mixtures of simple and complex triglycerides. Each of these triglycerides solidifies at a different temperature from the others, so that the common oils at certain temperatures will be partly solid and partly liquid. As most oils are preferred wholly, either in the solid state or the liquid state, it is desirable that the oil be separated into fractions of different solidification points, where the temperature of the oil will naturally segregate into two phases, occurs at the temperature at which the oil is usually maintained.

As an example, cotton seed oil, which is primarily used in the liquid phase contains a number of high melting point glycerides, which in the aggregate are known to the trade as cotton seed stearin. Unless these are removed, they will precipitate from the oil when it is used for salad preparations and stored at usual ice box temperatures. Furthermore, such oil if used in the manufacture of mayonnaise will cause a deterioration of the mayonnaise by demulsification when the mayonnaise is chilled.

In a further example, lard is commonly used in the solid state. Under certain conditions appreciable quantities of low melting oil may be present in the lard. This low melting point lard will either cause the product to have a soft pasty consistency under usual temperature conditions, or in some cases they may form the liquid layer, if present in sufficient quantities.

My method provides efficient means whereby oils which contain sufficient quantities of both high melting point and low melting point compounds as to make the presence of one or the other undesirable, may be separated into fractions from which low melting point components will predominate in one fraction and high melting point components will predominate in another fraction.

The principal objects of my invention then are as follows:

1. To provide novel apparatus for and methods of efficiently separating oils into fractions in which one fraction contains no appreciable quantities of components solidifying above a predetermined temperature level.
2. To provide means for efficiently separating oils into fractions in which one fraction contains no appreciable components, melting below a predetermined temperature level.
3. To provide methods of and means for combining both the above mentioned objects. Other objects of my invention will be apparent in the following descriptions.

My invention will now be described in further details by the accompanying drawings which are a part of these specifications. In these drawings:

Figure 1 is a diagrammatic layout of one embodiment of my inventiton in which three separate solutions, each containing a separate oil fraction, may be continuously extracted and in which these three separate solutions may be continuously separated into solvent and extract, either with or without further fractionation of the oil into components.

Figure 2 is a diagrammatic layout of another embodiment of my invention similar to Figure 1 except that further fractionation of only one of the solutions after extraction is shown and this embodiment provides for the use of two separate solvents.

Figure 3 is a diagrammatic layout of another embodiment of my invention in which a single solution is continuously obtained from the extractor and this single solution is divided into fractions while the solution still contains appreciable quantities of the solvent.

Figure 4 is a diagrammatic layout of a further embodiment of my invention in which extraction is accomplished in batches. The handling of the solution obtained from this modification may be accomplished in the same manner as illustrated in Figures 1, 2 or 3.

Figure 5 is a diagrammatic layout of a further embodiment of my invention wherein the solvent is removed from the solution in batches. This modification is particularly applicable where the extraction is done in batches as illustrated in Figure 4.

Figure 6:
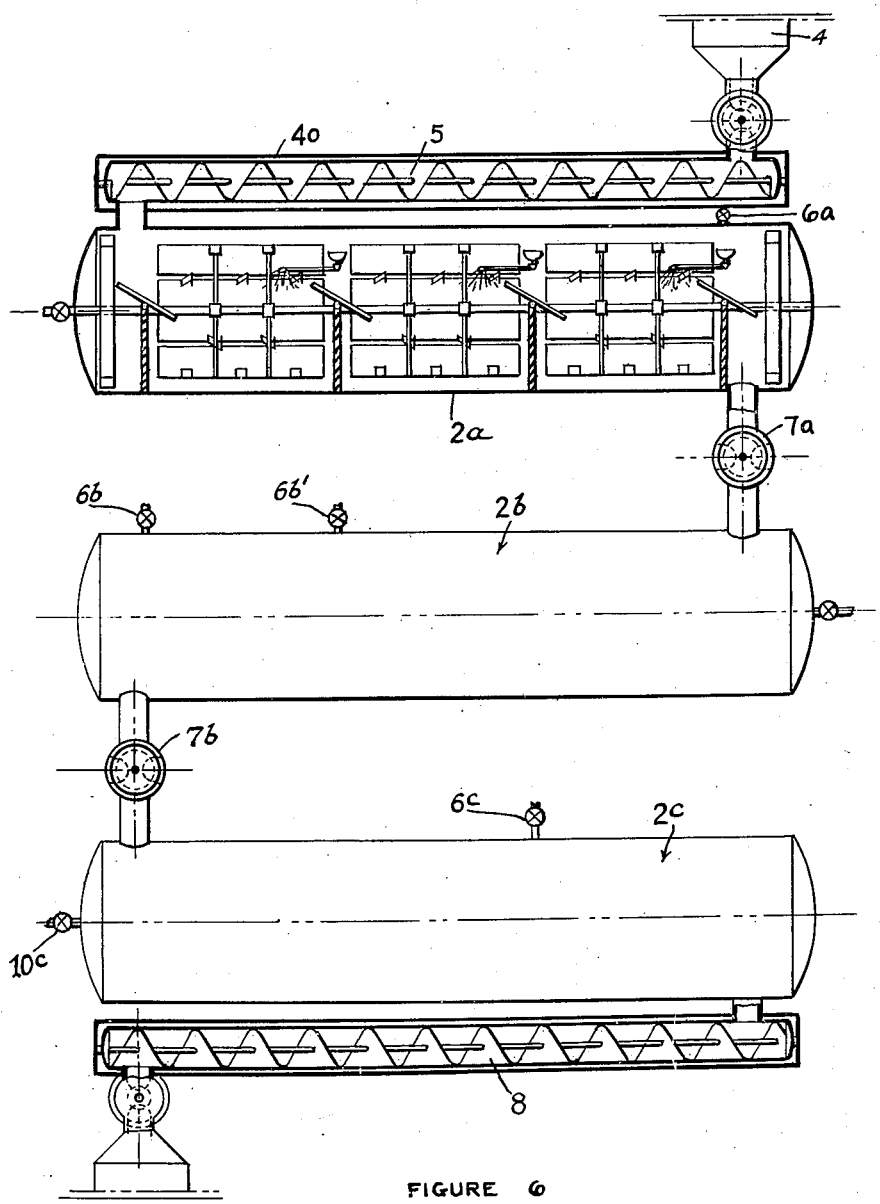
Figure 6 shows the details of a continuous extractor especially adapted for use with the embodiment of my invention illustrated in Figures 1 and 2.

I prefer that the extraction be conducted in the extractor of the type specified and claimed either in my co-pending application entitled "Oil treating process", S. N. 738,399, or of the type specified and claimed in my co-pending application entitled "Oil extraction", S. N. 738,400. Both of these applications are filed coincidentally with this application. I do not, however, limit my invention for use with these particular extractors. The extraction unit illustrated in Figure 6 is a modification of that described in the above mentioned application entitled "Oil treating process" and is especially applicable where a plurality of solution containing different oil fractions in solution from the same raw material are desired.

Referring to Figure 1, containers 1a, 1b and 1c are tanks for the storage of solvent. The temperature of the solvent in each of these tanks is different than the temperature of the solvent in the other two, the upper tank 1a having the lowest temperature, 1b having an intermediate temperature and 1c the highest temperature. The temperature maintained in 1a should be such that when the solvent from this tank is applied to the material in cylinder 2a of extractor 3, high and intermediate melting point compounds of the oil contained in the oleaginous material delivered to the cylinder 2a through the inlet compartment 4 and the conveyor 5 will remain almost entirely with the oleaginous material and will not pass into solution. This solvent from the tank 1a enters the cylinder 2a by means of valve 6a. Solvent from the tank 1b enters the second cylinder of the extractor 2b by means of the valve 6b. Similarly, solvent from tank 1c enters the third cylinder 2c of the extractor through the valve 6c.

The oleaginous materials enter the extractor through the sealed inlet compartment 4 and the screw conveyor 5 from which it is delivered to the upper cylinder 2a of the extractor where it passes in a countercurrent direction to the solution in the manner described in detail in my copending application of even date, referred to hereinbefore. In this cylinder the material being extracted is contacted with the solvent and after the oily fraction having the lowest melting point has been extracted, the solid material passes out of the cylinder 2a through the rotary valve 7a into compartment 2b. Prior to delivering the solid material from cylinder 2a to cylinder 2b, it is not necessary to remove solvent from the solid material as in the cylinder 2b the solid meets an additional quantity of the same solvent but at a higher temperature. This temperature is maintained at such a value that the small quantities of the low melting point material as may have been left from the extraction in the first cylinder will be substantially and completely removed and that the major portion of the intermediate melting point materials of the oil will pass into solution leaving substantially only the higher melting components of the oil unextracted in the meal.

Solid material remaining after extraction in cylinder 2b is delivered to the cylinder 2c through the rotary valve 7b. As in the passage of the solid material from cylinder 2a to 2b, efficient drainage of solvent from the meal is not necessary, neither is it necessary in the passage from cylinder 2b to 2c where the same solvent is used in 2c as used in 2b as illustrated in this figure. The extraction in cylinder 2c is conducted at temperatures sufficiently high so that all of the oil remaining in the meal may be substantially completely removed. Before discharging the meal from the cylinder 2c, it should be efficiently drained before its delivery to the treated conveyor 8, in which the solvent remaining in the meal is substantially completely vaporized before the meal is delivered to the sealed outlet compartment 9.

Solution from cylinder 2a is withdrawn through valve 10a to the equalizing tank 11a. Solution from cylinder 2b is withdrawn through valve 10b to the equalizing tank 11b. Similarly, solution from cylinder 2c is delivered to tank 11c.

In Figure 1, the portion above the broken line AA illustrates the method of treating the solution obtained from cylinder 2a. The portion above the line BB, but below the line AA, represents a method of treating the solution obtained in cylinder 2b. The portion above the line CC, but below the line BB, represents a method of treating the solution obtained in cylinder 2c. Each of these portions are substantially alike and, therefore, description will be confined to the portion lying above line AA except for such details as wherein the three portions may vary from each other.

Solution from tank 11a is delivered to the filter 12a by means of the pump 13a. Solution from the filter 12a may be handled in one of two different ways. If no further fractionation is desired than that obtained in the extractor, the solution is delivered through the valve 14a to the heat exchanger 15a from which it passes to the still 16a, operated at the pressure of the condenser 17. In still 16a solvent is removed by the application of heat and the solvent vapors pass from the top of the still to the condenser. The extract from which most of the solvent has been removed passes from the bottom of the still through valve 18a either through the filtering means 19a or directly to the still 20a, where further solvent is removed by the application of heat at a lower pressure maintained by the exhauster 21. This exhauster compresses the solvent vapors removed and delivers them to the condenser 17. Where it is desirable that a bleached product be obtained, the solution of solid bleach may be contained in tank 22a and mixed with the oil discharged from the bottom of still 20a through valve 23a to the still 24a where the final traces of solvent are removed. Vacuum may be maintained in still 24a and/or open steam may be used. Where open steam is used, the vapors from still 24a pass through condenser 25 where the major portion of the steam is condensed before the vapors are delivered to the exhauster 26. Exhauster 26 compresses the vapors removed from still 24a to pressure at which they may be condensed in the condenser 27. The condensate from condenser 27 is delivered to the separator 28 where the water is removed through valve 29 and the solvent is delivered by pipe 30 to solvent tank 31 where it meets the condensate from condenser 17. The oil from still 24a is removed by means of pump 32a and is delivered to the cooler 33a to the oil storage tank 34a. Where the oil from still 24a is not clear and brilliant, it may pass through filtering means 35a before being delivered to the oil cooler.

Solvent from tank 31 is returned to the solvent storage tanks 1a, 1b and 1c by means of the pump 36. The solvent first passes through heat exchanger 15c where it is partially cooled and a portion of the cooled solvent is delivered to tank 1c through the valve 37c. The remaining solvent passes through heat exchanger 15b where it is further cooled and a portion of the solvent cooled in this exchanger is delivered to the tank 1b through the valve 37b. A further portion is delivered to the heat exchanger 15a where it is still further cooled and passed to the solvent tank 1a through the valve 37a.

Temperature in solvent tank 1a may be controlled at any predetermined value below that of the atmosphere by opening valve 38a and allowing solvent vapors to pass into the suction of exhauster 21. Similarly, the temperature in tank 1b can be controlled, allowing solvent vapors to pass through valve 38b. Likewise, the temperature in tank 1c may be controlled by the operation of valve 38c.

In order to obtain the first cut reasonably free from higher melting point components, it is necessary to cool the solid material fed into cylinder 2a prior to its delivery to the cylinder. This may be done in the conveyor 5 either by passing solvent vapors from the extractor through the conveyor and valve 39 to the suction of compressor 21, or it may be done by passing the cooling medium through jacket 40 of conveyor 5 (see Figure 6).

Where the solution in the extractor has not been carried on in such a manner as to divide the oil into sufficiently sharp fractions, further fractionation may be obtained by closing the valves 14a, 14b and 14c and further treating the solutions prior to the elimination of solvent from the solution. In this case, valve 41a and 42a are opened, which permits the solution from cylinder 2a to enter the separating means illustrated by the settling tank 43a and the filter 44a before being delivered to the heat exchanger 15a and the still 16a. The settling tank 43a may be maintained at any predetermined temperature, preferably below that maintained in cylinder 2a by opening valve 45a which permits solvent vapors to be withdrawn from the settling tank by exhauster 21. The temperature maintained in 43a is preferably such that all of the components belonging in either the second or third fraction will be precipitated along with small amounts of the components belonging in the first fraction. This precipitate separated from the remaining solution either by filtering or decanting is delivered by suitable means, such as the pump 46a, through the heat exchanger 47b to the tank 43b and filter 44b. Where the separation is made as by decanting, enough liquid will generally accompany the solid material so that it can be pumped directly. Where the solid is separated by filtering, it will have to be melted by the application of heat before it can be pumped. The material left in solution will be delivered to the heat exchanger 15a and the still 16a and treated in a manner previously described. This method of treatment insures that the oil delivered to the oil storage tank 34a will contain no undesirable high melting point components.

In a similar manner, the solution from cylinder 2c can be delivered to the settling tank 43b and filter 44b by opening valve 41b. Here a temperature is maintained that will precipitate from the solution such components as are of higher melting point than is desired in the product to be delivered to tank 34b. These components are removed by pump 46b and delivered through heat exchanger 47c to tank 43c and filter 44c. A portion of the solution from 43b and 44b may be delivered back through heat exchanger 47b to tank 43a, if appreciable amounts of components which can be incorporated with the product for delivery to 34a are included in the solution delivered to tank 43b. The balance of solution from 43b and 44b are delivered to heat exchanger 15b and still 16b in a manner previously described.

The solution from the cylinder 2c may be delivered to the settling tank 43c and filter 44c by opening valve 41c. The fraction to be collected in tank 34c is usually desired as being normally solid under usual temperature conditions. Therefore, in tank 43c, it is usually the purpose to remove a normally liquid impurity from a normally solid fraction. The temperature should, therefore, be maintained at such a value that the normally liquid components contained in tank 43c will remain in the solution and that minor fractions of the lowest melting point components of the solid fraction also remain in the solution. In this case, all of the solution which is separated, is returned through valve 48c and heat exchanger 47c to the settling tank 43b. The solid material separated in 43c and 44c is delivered by any suitable means as described below to the heat exchanger 15c and the still 16c where it is treated in a manner hereinbefore described.

The solid material is somewhat heavier than the liquid solution and will tend to settle toward the bottom of tank 43. When such solid material is withdrawn from the bottom of the tank, it will be mixed with sufficient liquid so that the mixture may be pumped with a pump of suitable design. However, such solid as is separated in the filter, such as 44a, will be too stiff to be freely pumped by itself. This solid can readily be moved by adding solvent especially if this solvent is at a slightly higher temperature than that maintained in tank 43a. This solvent can be introduced to wash down the solid material in filter 44a by opening valve 56b' which admits solvent which has previously been cooled in heat exchanger 15b. Similar operations may be performed in the other cooling stages.

It should be noted that the sharpness of the cuts will depend to some extent upon the amount of refluxing which takes place between the various separating means maintained under different temperature conditions. The greater the amount of refluxing relative to the amount of product withdrawn at any stage, the sharper will be the cuts obtained. Thus by increasing the reflux ratio, products with relatively sharp differentiations of melting point can be secured.

It should further be noted that by closing the valve 49 and refluxing all of the solution from the intermediate separator to the first separator and refluxing all of the precipitate from the intermediate separator to the third separator, two end products may be obtained instead of three. However, one or the other of the end products must contain some intermediate components where only two fractions are secured. As an example, if cotton seed oil is divided into three fractions, one fraction may be a winter oil, another fraction may be a hard stearin and the third fraction would contain intermediate products not desirable in either of the other two. If, on the other hand, only two fractions are obtained and one of these is a "winter" oil, the other fraction will be a soft oily stearin.

In Figure 2, provision is made for using two separate solvents rather than one solvent as illustrated in Figure 1. This is sometimes desirable where the oily fractions desired have melting points widely divergent from each other requiring considerable change in temperature in passing from one of the fractions to another. Thus propane might be used as the solvent at low temperatures for the material in cylinders 2a and 2b of extractor 3. Since the material to be extracted from cylinder 2c of the extractor should give an oil of high melting point, it might be advantageous to use butane which has a lower vapor pressure than propane for conducting the extraction in cylinder 2c. Where this is done the solvent systems must be separated as far as possible to prevent excessive contamination of one solvent by the other. In this modification, solvent from tank 1b passing through valve 6b should enter a point in cylinder 2b such that the solvent may be drained from the solid material within the cylinder before such solid material is passed on and delivered to the cylinder 2c. As shown, the solvent tank 1c is equipped with a tempering coil 50 by which the temperature of the solvent within the tank can be controlled at any predetermined value. With this modification, a certain amount of fractionation can be accomplished in the solution after it is drawn from the extractor, but solutions cannot be refluxed in the same manner as shown and described in Figure 1 unless separate means for fractionating the solvent are provided. I, therefore, prefer that the solution from cylinder 2c be passed directly to the heat exchanger 15c and the still 16c when more than one solvent is used for extraction. Furthermore, in this modification separate exhausters and condensers must be used with each solvent. Thus, as shown in Figure 2, condensers 17c and 27c are equivalent to condensers 17 and 27, respectively in Figure 1, and exhausters 21c and 26c are equivalent to exhausters 21 and 26 of Figure 1 except that this equipment is used only in connection with that stage of the separation in Figure 2 which uses the second solvent. In Figure 2, 51a is a still maintained at the same pressure as condenser 17. The temperature within still 51 is controlled at some predetermined value so that the amount of solvent in the solution leaving the still may also be maintained at some predetermined value. With still 51a is a heat exchanger 52a. Solution leaving filter 12a may be passed through valve 53a heated in the heat exchanger 52a, passed to the still 51a and returned to the heat exchanger 52a through valve 54a prior to its delivery to the settling tank 43a. In this manner, a solution of substantially definite concentration is always contained within the settling tank and separation in the tank can be more closely controlled than if it was provided with a solution of varying concentration. Still 51a and heat exchanger 52 are not required unless the solution from extractor cylinder 2a is further fractionated before the solvent is completely eliminated.

Now referring to Figure 3, in this modification, a single solution only is obtained during the extraction and this solution is fractionated prior to the elimination of solvent from the solution.

As shown, the solution obtained from the single extractor cylinder is delivered to tank 11 from which it is removed by pump 13 to heat exchanger 52, still 51, valve 55 to the settling tank 43a and filter 44a. Here the low melting point fraction is separated and delivered to the heat exchanger 15a and further treated in the same manner as described for Figure 1. The high melting point fraction is delivered by pump 46a to the settling tank 43b and filter 44b. As this fraction will be deficient in solvent for further separation, additional solvent which has passed through heat exchanger 15b may be added at any convenient point, such as through valve 56b or 56b'. This fraction is then treated in the same manner as described in explaining Figure 1. In the same manner as the material entering 43b was deficient in solvent for the most efficient fractionation so the material passing into separating tank 43c will be deficient in solvent. This deficiency can be overcome by admitting solvent which has passed through heat exchanged 15c into the settling tank by opening valve 56c.

In one form of my invention fractionation of an oil into components of different melting points with refluxing is accomplished by the reintroducing of solvents. As shown in Figure 3, this separation can be accomplished using my method by closing valve 55 and opening valves 57 and 58. In this manner, oil to be fractionated is stored in tank 59 from which it is delivered by pump 60 to the mixing tank 61 where it meets solvent through valve 58 and is delivered through valve 57 to the system where it is divided into fractions of different melting points and a plurality of separating means, each operating under different conditions with a refluxing of solution between these separating means.

Figure 4 is a modification of my invention showing its adaptability to batch extraction methods. This modification may be applied to Figures 1, 2 or 3. In Figure 4, the single cylinder of batch extractor 3 may be used in a consecutive manner to perform the same functions as are performed simultaneously in cylinders 2a, 2b and 2c of Figure 1. Thus after the extractor is charged with the oleaginous material and properly prepared for the reception of the solvent, solvent from tank 1a is admitted through valve 6a and the solution is discharged through valve 10a to tank 11a from which it may be handled in the same manner as described and shown for Figure 1. After the solution has been discharged from the extractor, valve 6b may be opened and solvent from tank 1b delivered to the extractor. After treatment with this solvent, the solution is discharged from the extractor through valve 10b to tank 11b. Subsequently, solvent is admitted to the extractor through valve 6c and solution discharged through valve 10c to tank 11c. Provided tanks 11a, 11b and 11c are of sufficient size, further treatment can be conducted in exactly the same manner as was described for Figure 1. No change is needed in Figure 4 to adapt the batch system of extraction to Figure 2.

Figure 5 is a further modification adapted to the use of batch extraction as shown in Figure 4 where all of the fractionation is accomplished within the extractor. In this modification, the still 62 accomplishes in a consecutive manner the functions that stills 16, 20 and 24 perform simultaneously. Thus considering first the solution of low melting point oil contained in tank 11a, this solution is delivered through valve 63a to pump 13 from which it is delivered to filter 12 through heat exchanger 15 to the still 62. By opening valve 64, the vapors from still 62 are placed in communication with condenser 17 where the vapors are condensed and delivered to tank 31. For this operation, still 62 thus performs the same operation as still 16 in the previous figures. After the solvent has been removed at the pressure of condenser 17, valve 64 is closed and valve 65 is opened which places the vapor space of the still 62 in communication with exhauster 21. For this operation still 62 performs the same functions as are performed in the still 20 in the previous figures. When this operation is completed, valve 65 is closed and valve 67 is opened which places the still 62 in communication with exhauster 26 which is the equivalent operation that is performed in still 24, and by this operation, the solvent is substantially and completely eliminated from the extract remaining in still 62. This extract is then delivered through oil cooler 33 and valve 66a to oil storage tank 34a. The intermediate fraction in tank 11b and the high melting point fraction in tank 11c each may be separately handled in a manner similar to that just described in handling the low melting point fraction from 11a.

Now referring to Figure 6, which is a detail of a continuous extractor suitable for performing the operation described; in each of the cylinders 2a, 2b and 2c, the material to be extracted is fed into the cylinder at one end and discharged at the other end. Solvent is fed to each cylinder countercurrently to the flow of solid and the solution is withdrawn from each cylinder at the same end at which the solid material is charged to the cylinder. Between each cylinder 2a, 2b, 2c is a rotary valve 7a, 7b which permits each cylinder to be carried at a different pressure. This is necessary where the solvent is a hydrocarbon liquid, which is a gas under normal conditions of temperature and pressure, and where the temperature in each cylinder is different from the temperature in the other cylinders.

Where a single solvent is used, solvent is fed to the two upper cylinders at the end opposite that at which the solution is removed. In this way the solid material is treated in all the compartments within the cylinder in these two cylinders. In the lower cylinder, the solvent is fed at an intermediate point to the cylinder, thus permitting the last compartment through which the meal is passed prior to its discharge to the conveyor 8 being utilized as a drain. Likewise, when a different solvent is used in the lower cylinder than is used in the upper two cylinders, solvent is delivered to the middle cylinder at an intermediate point, thus permitting the last compartment in this cylinder to be used to drain the solvent from the meal. Thus where a single solvent is used, I prefer that the solution be admitted to the middle cylinder at the point 6b, while where a different solvent is used in cylinder 2c than is used in cylinders 2a and 2b, I prefer that solvent be admitted to cylinder 2b at the point 6b'.

Many changes may be made in detail without departing from the spirit of my invention and having described it so that it may be readily understood by one skilled in the art, I claim:

1. The method of separating fatty oils into fractions of different melting points which comprises subjecting oleaginous materials to a solvent while maintaining temperatures such that the higher melting point components remain largely unextracted, withdrawing the solution, then subjecting the oleaginous materials to a solvent while maintaining temperatures such that the higher melting point components are largely extracted, withdrawing the solution, maintaining the first mentioned solution under conditions that higher melting point components are largely precipitated therefrom, separating the solution from the precipitate, simultaneously separately maintaining the solution from the second mentioned extraction under conditions that the lower melting point components remain in solution while the higher melting point components are largely precipitated, separating the solution from the precipitate, substantially continuously adding the precipitate from the first mentioned precipitation to the solution from the second mentioned extraction, substantially continuously adding the solution from the second mentioned precipitation to the solution from the first mentioned extraction, withdrawing solution from the first mentioned precipitation and precipitate from the second mentioned precipitation, and eliminating solvent from the solution from the first mentioned precipitation and from the precipitate from the second mentioned precipitation.

2. The method of separating fatty oils into fractions of different melting points which comprises subjecting oleaginous materials to a solvent, withdrawing the solution, then subjecting the solution to temperatures such that the higher melting fatty components of the oil in solution are precipitated as a solid, separating the solid precipitate from the liquid, withdrawing the solid precipitate and maintaining it under conditions that the lower melting point fatty components are in liquid solution, separating the solid fraction from the liquid fraction, substantially continuously returning a portion of said liquid fraction to the solution withdrawn from the extraction, withdrawing said second named solid fraction and removing solvent therefrom, and separately removing solvent from liquid solution withdrawn from the first mentioned precipitation stage.

3. The method of separating fatty oils into fractions of different melting points which comprises subjecting oleaginous materials to a solvent, withdrawing the solution, then subjecting the solution to a plurality of simultaneous stages under successively graduated temperature conditions, whereby the oil in the solution and precipitated fatty fraction in each stage has a different melting point than the similar phase in other stages, separating the precipitated fatty fraction from the liquid fraction in each of the stages, simultaneously feeding the oil in solution of one stage back into the preceding stage, withdrawing a plurality of fatty fractions admixed with solvent, and finally removing the solvent from said withdrawn fatty fractions.

4. In the method of separating fatty oil into fractions, the steps which comprise obtaining a solution of said oil in a solvent, subjecting the solution to a plurality of simultaneous stages under different conditions to obtain a fatty oil partly in the liquid phase and partly in the solid phase in each stage, the solid and liquid phase in each stage containing oil of a different melting point than the similar phases in other stages, separating the solid and liquid phase, simultaneously feeding oil in solution in one stage back into a preceding stage, and withdrawing a plurality of fatty fractions admixed with solvent from the stages.

5. In the separation of fatty oil into fractions, the steps which comprise obtaining a solution of said oil in propane, subjecting the solution to a plurality of simultaneous stages under different conditions to produce a fatty fraction partly in the liquid phase and partly in the solid phase in each stage, the solid and liquid phase in each stage containing fatty fraction of a different melting point than the similar phases in other stages, separating the solid and liquid phase, simultaneously feeding oil in solution in one stage back into a preceding stage, and withdrawing a plurality of fatty fractions admixed with solvent from said stages.

6. In the separation of fatty oil into fractions, the steps which comprise obtaining a solution of said fatty oil in a hydrocarbon which is gaseous under normal conditions of temperature and pressure, subjecting the solution to a plurality of simultaneous stages under different conditions to obtain a fatty fraction in each stage partly in the liquid phase and partly in the solid phase, the solid and liquid phase in each stage containing oil of a different melting point than the similar phases in the other stages, separating the solid and the liquid phase, substantially continuously feeding oil in solution in one stage back into a preceding stage, and withdrawing a plurality of fatty fractions admixed with solvent from said stages.

7. In the method of separating fatty oils into fractions, the steps which comprise obtaining a solution of said oil in a solvent; subjecting the solution to a plurality of simultaneous stages under different conditions to obtain a fatty fraction partly in the liquid phase and partly in the solid phase in each stage, the solid and liquid phase in each stage containing oil of a different melting point than in other stages, the first stage being maintained under conditions that substantially all of the high melting components and an appreciable portion of the low melting components are in the solid phase; separating the solid and the liquid phase; simultaneously feeding oil in solution in one stage back into a preceding stage; and withdrawing fatty fraction admixed with solvent containing substantially no high melting components from said first stage.

8. In the method of separating fatty oils into fractions, the steps which comprise obtaining a solution of said oil in a solvent; subjecting the solution to a plurality of simultaneous stages under successively increasing temperature conditions to obtain a fatty fraction partly in the liquid phase and partly in the solid phase in each stage; the solid and the liquid phase in each stage containing oil of a different melting point than in other stages; separating the solid and the liquid phase; simultaneously feeding oil in solution in one stage back into a preceding stage, the oil in solution so fed back being in heat exchange with material delivered from said preceding stage; and withdrawing a plurality of fatty fractions admixed with solvent containing oils of different melting points from the stages.

9. In the method of separating fatty oils into fractions, the steps which comprise obtaining a solution of said oil in a solvent; subjecting the solution to a plurality of simultaneous stages under different conditions to obtain a fatty fraction partly in the liquid phase and partly in the solid phase in each stage; the solid and liquid phase in each stage containing oil of a different melting point than in other stages; the last stage being maintained under conditions that substantially all of the low melting components and an appreciable portion of the high melting components are in the liquid phase; separating the solid and the liquid phase; simultaneously feeding oil in solution in one stage back into a preceding stage; and withdrawing a fatty fraction admixed with solvent containing only a minor fraction of low melting components from said last stage.

10. The method of separation, into fractions of different melting points, of fatty oils that tend to separate into solid and liquid phases at the temperatures at which they are used, which method comprises: subjecting solid oleaginous materials comprising fatty oil in a non-oily matrix to a liquid solvent while maintaining temperatures such that normally solid components of the oil form a solid solution and normally liquid components of the oil pass into a liquid solution with the solvent; withdrawing the liquid solution, and separating the solvent from the liquid solution.

11. The method of separation, into fractions of different melting points, of fatty oils that tend to separate into solid and liquid phases at the temperatures at which they are used, which method comprises: subjecting solid oleaginous materials comprising fatty oil in a non-oily matrix to a liquid solvent while maintaining temperatures such that normally solid components of the oil form a solid solution while normally liquid components of the oil pass into liquid solution; withdrawing the liquid solution; subsequently subjecting the residual solid oleaginous materials to a liquid solvent while maintaining higher temperatures such that substantially all of the normally solid components of the oil pass into liquid solution; withdrawing the second liquid solution; and independently removing solvent from each liquid solution.

12. The method of separating, into fractions of different melting points, fatty oils that tend to separate into solid and liquid phases at the temperatures at which they are used, which method comprises: successively subjecting solid oleaginous materials comprising fatty oil in a non-oily matrix to a solvent at successively higher temperature stages, the initial stage being maintained at a temperature that normally solid components of the oil form a solid solution and normally liquid components of the oil pass into a liquid solution, and a later stage being maintained at a temperature that the normally solid components of the oil pass into a liquid solution; separately withdrawing the liquid solution from each stage; and independently removing solvent from each liquid solution.

13. The method of separation, into fractions of different melting points, of fatty oils that tend to separate into solid and liquid phases at the temperatures at which they are used, which method comprises: successively subjecting solid oleaginous materials comprising fatty oil in a non-oily matrix to a solvent which is gaseous under normal temperature and pressure while maintaining said solvent in the liquid state; successive treatments being conducted at successively higher temperatures, the initial treatment being conducted at a temperature such that normally solid components of the oil form a solid solution and normally liquid components of the oil pass into a liquid solution, a later treatment being conducted at a temperature such that normally solid components of the oil pass into a liquid solution; separately withdrawing the liquid solution from each treatment; and independently removing solvent from each liquid solution.

14. The method of separating, into fractions of different melting points, fatty oils that tend to separate into solid and liquid phases at the temperatures at which they are used, which method comprises: successively subjecting solid oleaginous materials comprising fatty oil in a non-oily matrix to a hydrocarbon solvent which is gaseous under normal temperature and pressure while maintaining said solvent in the liquid state; successive treatments being conducted at successively higher temperatures, the initial treatment being conducted at a temperature such that normally solid components of the oil form a solid solution and normally liquid components of the oil pass into a liquid solution, a later treatment being conducted at a temperature such that normally solid components of the oil pass into a liquid solution; separately withdrawing the liquid solution from each treatment; and independently removing solvent from each liquid solution.

15. The method of separating, into fractions of different melting points, fatty oils that tend to separate into solid and liquid phases at the temperatures at which they are used, which comprises: successively subjecting solid oleaginous materials comprising fatty oil in a non-oily matrix to liquid butane, successive treatments being conducted at successively higher temperatures, the initial treatment being conducted at a temperature such that normally solid components of the oil form a solid solution and normally liquid components of the oil pass into a liquid solution, a later treatment being conducted at a temperature such that normally solid components of the oil pass into a liquid solution; separately withdrawing the liquid solution from each treatment; and independently removing solvent from each liquid solution.

16. The method of separting, into fractions of different melting points, fatty oils that tend to separate into solid and liquid phases at the temperatures at which they are used, which method comprises: successively subjecting solid, oleaginous materials comprising fatty oil in a non-oily matrix to liquid propane, successive treatments being conducted at successively higher temperatures, the initial treatment being conducted at a temperature such that normally solid components of the oil form a solid solution and normally liquid components of the oil pass into a liquid solution, a later treatment being conducted at a temperature such that normally solid components of the oil pass into a liquid solution; separately withdrawing the liquid solution from each treatment, and independently removing solvent from each liquid solution.

17. The method of separating, into fractions of different melting points, fatty oils that tend to separate into solid and liquid phases at the temperatures at which they are used, which method comprises: subjecting solid, oleaginous materials, comprising fatty oil in a non-oily matrix, to a solvent while maintaining temperatures such that the normally solid components remain largely in the solid phase while the normally liquid components pass into liquid solution; withdrawing the liquid solution; maintaining the liquid solution under conditions that the portions of the normally solid components, if any, extracted in said liquid solution are largely precipitated; separating the liquid solution from the solid solution; and removing solvent from the separated liquid solution.

18. The method of separating, into fractions of different melting points, fatty oils that tend to separate into solid and liquid phases at the temperatures at which they are used, which method comprises: subjecting solid, oleaginous materials comprising a fatty oil in a non-oily matrix to a solvent while maintaining temperatures such that the normally solid components remain largely in the solid phase and the normally liquid components enter into liquid solution; withdrawing the liquid solution; subsequently subjecting the residual, solid, oleaginous materials to a solvent while maintaining higher temperatures such that the normally solid components enter into liquid solution; withdrawing said liquid solution; maintaining the first mentioned liquid solution under conditions that substantially all of the remaining normally solid components thereof, if any, are largely precipitated therefrom; separating the liquid from the precipitate; eliminating solvent from said liquid; separately maintaining the solution from the second mentioned extraction under conditions that the normally liquid components thereof remain in solution while the normally solid components thereof are largely precipitated therefrom; separating the liquid from the precipitate; and eliminating solvent from the precipitate.

19. In a continuous process, the method of separating into fractions of different melting points, fatty oils that tend to separate into solid and liquid phases at the temperatures at which they are used; which method comprises: subjecting oleaginous solids, comprising fatty oil in a non-oily matrix, to a continuously flowing solvent to separate the oil from its matrix at a temperature such that the normally solid components of the oil remain largely as a solid in said matrix and the normally liquid components of the oil enter into liquid solution; continuously withdrawing the liquid solution; then subjecting the liquid solution to temperatures such that the normally solid components that may have entered the liquid solution are largely precipitated therefrom; separating the liquid solution from the precipitate; and separately eliminating solvent from the solution and the precipitate.

HENRY ROSENTHAL.